US012190602B2

(12) United States Patent
Nakabayashi et al.

(10) Patent No.: US 12,190,602 B2
(45) Date of Patent: Jan. 7, 2025

(54) WORKING VEHICLE, OBSTACLE DETECTION METHOD, AND OBSTACLE DETECTION PROGRAM (71) Applicant: Kubota Corporation, Osaka (JP)

(72) Inventors: Takashi Nakabayashi, Sakai (JP); Toshiki Watanabe, Sakai (JP); Shunsuke Edo, Sakai (JP); Shunsuke Miyashita, Sakai (JP); Kenichi Iwami, Sakai (JP)

(73) Assignee: Kubota Corporation, Osaka (JP)

(*) Notice: Subject to any disclaimer, the term of this patent is extended or adjusted under 35 U.S.C. 154(b) by 283 days.

(21) Appl. No.: 17/603,452

(22) PCT Filed: May 20, 2020

(86) PCT No.: PCT/JP2020/019933
§ 371 (c)(1),
(2) Date: Oct. 13, 2021

(87) PCT Pub. No.: WO2020/261824
PCT Pub. Date: Dec. 30, 2020

(65) Prior Publication Data
US 2022/0207882 A1 Jun. 30, 2022

(30) Foreign Application Priority Data

Jun. 25, 2019 (JP) ................. 2019-117488

(51) Int. Cl.
*G06V 20/58* (2022.01)
*A01B 69/04* (2006.01)
(Continued)

(52) U.S. Cl.
CPC ............ *G06V 20/58* (2022.01); *A01B 69/008* (2013.01); *G06T 11/00* (2013.01); *G06V 10/82* (2022.01);
(Continued)

(58) Field of Classification Search
CPC ...... G06V 20/58; G06V 10/82; A01B 69/008; G06T 11/00; G08G 1/16; G08G 1/165
See application file for complete search history.

(56) References Cited

U.S. PATENT DOCUMENTS

2018/0027179 A1* 1/2018 Matsuzaki ................ B60R 1/27
348/38
2018/0206392 A1* 7/2018 Matsuzaki ........... A01B 69/008
(Continued)

FOREIGN PATENT DOCUMENTS

EP 3272586 A1 1/2018
JP 201814554 A 1/2018
(Continued)

OTHER PUBLICATIONS

Lim et al., Obstacle Avoidance for Autonomous Driving using Neuro-Fuzzy Architecture in an Urban Landscape, 2018 International Conference on Intelligent Rail Transportation (ICIRT), IEEE, Dec. 12, 2018, pp. 1-5.

*Primary Examiner* — Ig T An
(74) *Attorney, Agent, or Firm* — The Webb Law Firm (57) ABSTRACT Provided is a working vehicle capable of operation and driving that includes a plurality of image capture devices 4 that capture an image of surroundings of a vehicle body; a direction detection unit 51 that detects an advancement direction of the operation and driving; an image selection unit 52 that acquires, as a detection image, a surrounding area image captured by one image capture device 4 of the plurality of image capture devices 4 capturing a front advancement direction detected by the direction detection unit 51; and a detection unit 53 that analyzes the detection image acquired by the image selection unit 52 and detects an obstacle.

21 Claims, 5 Drawing Sheets (51) Int. Cl.
  *B60K 35/00*     (2024.01)
  *B60K 35/28*     (2024.01)
  *G06T 11/00*     (2006.01)
  *G06V 10/82*     (2022.01)
  *G08G 1/16*      (2006.01)

(52) U.S. Cl.
  CPC ............ *G08G 1/16* (2013.01); *B60K 35/00* (2013.01); *B60K 35/28* (2024.01); *B60K 2360/16* (2024.01)

(56) References Cited

U.S. PATENT DOCUMENTS

2019/0146511 A1* 5/2019 Hurd .................... G06V 10/143
                                                  701/27
2020/0029490 A1* 1/2020 Bertucci ................ G06V 20/58

FOREIGN PATENT DOCUMENTS

| JP | 2018113937 A | 7/2018 | | |
|----|---|---|---|---|
| JP | 20194772 A | 1/2019 | | |
| JP | 201949918 A | 3/2019 | | |
| WO | WO-2020137135 A1 * | 7/2020 | ............. | G01S 15/86 |

* cited by examiner

WORKING VEHICLE, OBSTACLE DETECTION METHOD, AND OBSTACLE DETECTION PROGRAM

CROSS-REFERENCE TO RELATED APPLICATIONS

This application is the United States national phase of International Application No. PCT/JP2020/019933 filed May 20, 2020, and claims priority to Japanese Patent Application No. 2019-117488 filed Jun. 25, 2019, the disclosures of which are hereby incorporated by reference in their entirety.

BACKGROUND OF THE INVENTION

1. Field of the Invention

The present invention relates to a working vehicle, an obstacle detection method, and an obstacle detection program that detect an obstacle using a captured image of the surroundings of a vehicle body.

2. Description of Related Art

A working vehicle that operates while being driven may detect obstacles in the surroundings of the vehicle body by capturing an image of the vehicle body surroundings while being driven and operating using a plurality of cameras and using the captured image of the vehicle body surroundings. Obstacles are detected via an analysis of the captured image by a CPU, ECU, or the like.

Patent Document 1: JP 2019-49918A

SUMMARY OF THE INVENTION

The captured images of the vehicle body surroundings captured using the plurality of cameras corresponds to a very large amount of data. To analyze such a large amount of data of captured images with high accuracy, a processor with high processing power is required. However, there is a limit as to how much processing power a processor installed in a working vehicle can have, making a highly accurate analysis of the captured images of the vehicle body surroundings difficult to perform within a short amount of time.

The present invention is directed at using captured images of vehicle body surroundings to detect obstacles with high accuracy and within a short amount of time.

In order to achieve the object described above, a working vehicle according to an embodiment of the present invention is a working vehicle capable of operation and driving that includes a plurality of image capture devices that capture an image of surroundings of a vehicle body; a direction detection unit that detects an advancement direction of the operation and driving; an image selection unit that acquires, as a detection image, a surrounding area image captured by one image capture device of the plurality of image capture devices capturing a front advancement direction detected by the direction detection unit; and a detection unit that analyzes the detection image acquired by the image selection unit and detects an obstacle.

Obstacles in the surroundings of the vehicle body can be detected by image analysis of the images captured by the image capture devices. Also, the plurality of cameras may capture images of different sections of the surroundings of the vehicle body, the plurality of surrounding area images may be combined to generate a surroundings image, and the situation of the surroundings of the vehicle body may be displayed via a single image. By using the surroundings image for image analysis in this manner, obstacles in the surroundings of the vehicle body can be detected. However, the analysis device has limits on its performance, and using the surroundings image to detect obstacles with a high accuracy when the amount of data is large is difficult. In regards to this, with the configuration described above, from among the surrounding area images used to generate the surroundings image, the surrounding area image captured by the image capture device capturing the front advancement direction necessary for obstacle detection can be selectively used as the detection image in image analysis. By efficiently optimizing the detection image, obstacle detection can be executed using only the minimum required amount of data for the detection image, the data amount can be reduced, and obstacles can be easily detected with high accuracy in a short time.

Also, an automated driving control unit may be provided that executes automated driving control of the operation and driving so that pre-set actions are executed in order.

With such a configuration, even with automated driving, obstacles can be easily detected with high accuracy in a short time.

Also, in a case where an obstacle is detected by the detection unit, the automated driving control unit preferably changes a pre-set next one of the actions.

With such a configuration, situations such as the working vehicle colliding with an obstacle can be avoided, and appropriate operation and driving can be continued.

Also, the image selection unit may selectively acquire, as the detection image, the surrounding area image captured by one image capture device of the plurality of image capture devices capturing a front advancement direction of a next one of the actions a predetermined amount of time before the next one of the actions is started.

With such a configuration, before action transition, obstacles in the advancement direction of the next action can be detected, the action transition being performed regardless of the obstacle can be prevented, and situations such as the working vehicle colliding with an obstacle can be avoided.

Also, the image selection unit may selectively acquire, as the detection image, the surrounding area image captured by one image capture device of the plurality of image capture devices capturing a front advancement direction of a next one of the actions a predetermined distance behind a position where the next one of the actions is started.

With such a configuration, before action transition, the presence of obstacles can be identified, the action transition being performed regardless of the obstacle can be prevented, and situations such as the working vehicle colliding with an obstacle can be avoided.

Also, in a case where an obstacle is detected by the detection unit, the automated driving control unit preferably stops the operation and driving or stops transition between the actions.

With such a configuration, the working vehicle colliding with an obstacle can be reliably avoided. Also, when the obstacle is no longer present, the operation and driving can be restarted or there can be transition between actions. This allows appropriate operation and driving to be continued.

Also, the image selection unit may selectively acquire, as the detection image, the surrounding area image capturing a front advancement direction and the surrounding area image captured by one image capture device of the plurality of image capture devices capturing a region to a side of the vehicle body adjacent to a captured region of the surrounding area image capturing a front advancement direction.

With such a configuration, the data amount of the detection image can be reduced, a detection image with an optimized area can be efficiently selected, and obstacles can be detected with higher accuracy.

Also, the detection unit may detect an obstacle using a neural network trained by machine learning.

With such a configuration, obstacles can be detected more efficiently and with high accuracy.

Also, an image processing unit may be provided that combines the surrounding area images captured by the plurality of image capture devices and generates a surroundings image of an entire surroundings of the vehicle body; and a display device may be provided where the surroundings image is displayed.

With such a configuration, the driver or worker can easily check on the situation of the surroundings of the vehicle body.

Furthermore, an obstacle detection method according to an embodiment of the present invention is an obstacle detection method for when a worker performs operation and driving that includes capturing images of a surroundings of a vehicle body as a plurality of surrounding area images; detecting an advancement direction of the operation and driving; acquiring, from the plurality of surrounding area images, the surrounding area image capturing a front advancement direction as a detection image; and analyzing the detection image and detecting an obstacle.

Also, an obstacle detection program according to an embodiment of the present invention is an obstacle detection program for when a worker performs operation and driving that causes a processor to execute processing to acquire a plurality of surrounding area images capturing a surroundings of a vehicle body; processing to detect an advancement direction of the operation and driving; processing to select, from the plurality of surrounding area images, the surrounding area image capturing a front advancement direction as a detection image; and processing to analyze the detection image and detect an obstacle.

Obstacles in the surroundings of the vehicle body can be detected by image analysis of the images captured by the image capture devices. Also, the plurality of cameras may capture images of different sections of the surroundings of the vehicle body, the plurality of surrounding area images may be combined to generate a surroundings image, and the situation of the surroundings of the vehicle body may be displayed via a single image. By using the surroundings image for image analysis in this manner, obstacles in the surroundings of the vehicle body can be detected. However, the analysis device has limits on its performance, and using the surroundings image to detect obstacles with a high accuracy when the amount of data is large is difficult. In regards to this, with the configuration described above, from among the surrounding area images used to generate the surroundings image, the surrounding area image capturing the front advancement direction necessary for obstacle detection can be selectively used as the detection image in image analysis. By efficiently optimizing the detection image, obstacle detection can be executed using only the minimum required amount of data for the detection image, the data amount can be reduced, and obstacles can be easily detected with high accuracy in a short time.

Also, the operation and driving may be automated driving controlled so that pre-set actions are executed in order.

With such a configuration, even with automated driving, obstacles can be easily detected with high accuracy in a short time.

Also, in a case where an obstacle is detected, a pre-set next one of the actions is preferably changed.

With such a configuration, situations such as the working vehicle colliding with an obstacle can be avoided, and appropriate operation and driving can be continued.

Also, as the detection image, the surrounding area image capturing a front advancement direction of a next one of the actions may be selectively acquired a predetermined amount of time before the next one of the actions is started.

With such a configuration, before action transition, obstacles in the advancement direction of the next action can be detected, the action transition being performed regardless of the obstacle can be prevented, and situations such as the working vehicle colliding with an obstacle can be avoided.

Also, as the detection image, the surrounding area image capturing a front advancement direction of a next one of the actions may be selectively acquired a predetermined distance behind a position where the next one of the actions is started.

With such a configuration, before action transition, the presence of obstacles can be identified, the action transition being performed regardless of the obstacle can be prevented, and situations such as the working vehicle colliding with an obstacle can be avoided.

Also, when an obstacle is detected, the operation and driving is preferably stopped or transition between the actions is preferably stopped.

With such a configuration, the working vehicle colliding with an obstacle can be reliably avoided. Also, when the obstacle is no longer present, the operation and driving can be restarted or there can be transition between actions. This allows appropriate operation and driving to be continued.

Also, as the detection image, the surrounding area image capturing a front advancement direction and the surrounding area image capturing a region to a side of the vehicle body adjacent to a captured region of the surrounding area image capturing a front advancement direction may be selectively acquired.

With such a configuration, the data amount of the detection image can be reduced, a detection image with an optimized area can be efficiently selected, and obstacles can be detected with higher accuracy.

Also, an obstacle may be detected using a neural network trained by machine learning.

With such a configuration, obstacles can be detected more efficiently and with high accuracy.

Also, the plurality of surrounding area images may be combined and a surroundings image of an entire surroundings of the vehicle body may be generated; and the surroundings image may be displayed.

With such a configuration, the driver or worker can easily check on the situation of the surroundings of the vehicle body.

DESCRIPTION OF PREFERRED EMBODIMENTS

Figure 1:
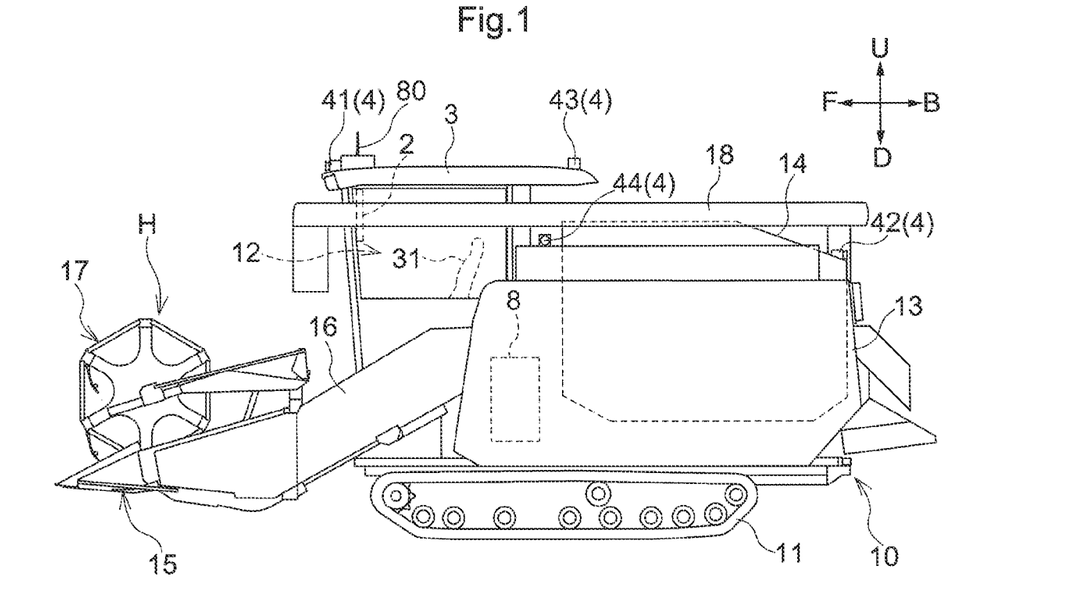
FIG. 1 is a right side view of a vehicle body of a standard combine harvester.

A standard combine harvester (hereinafter, simply referred to as a combine harvester) is described below with reference to the drawings as an example of a working vehicle according to the present invention. Note that hereinafter, the direction of arrow F in FIG. 1 is defined as the front, the direction of arrow B is defined as back, the direction to the front of the paper in FIG. 1 is defined as left, and the direction of the depth of the paper is defined as right. Also, the direction of arrow U in FIG. 1 is defined as up, and the direction of arrow D is defined as down.

Overall Configuration of Combine Harvester

First, the overall configuration of a combine harvester will be described using FIGS. 1 to 3. A combine harvester is provided with a crawler-type propulsion device 11, a driving section 12, a threshing device 13, a grain tank 14, a harvesting unit H, a conveying device 16, a grain discharge device 18, and a satellite positioning module 80. The conveying device 16, the threshing device 13, and the harvesting unit H are examples of work devices.

The propulsion device 11 is provided on the lower portion of a vehicle body 10. The combine harvester is configured to be self-propelled via the propulsion device 11.

Also, the driving section 12, the threshing device 13, and the grain tank 14 are provided above the propulsion device 11. The driving section 12 is provided with a driver seat 31 and a cabin 3 covering the driver seat 31. The driver seat 31 is where the operator of the combine harvester or an observer who monitors the work can sit. Note that the observer may monitor the work of the combine harvester from outside of the combine harvester. A display device 2 is disposed in the driving section 12.

The grain discharge device 18 is provided above the grain tank 14. Also, the satellite positioning module 80 is provided on the upper surface of the driving section 12.

The harvesting unit His provided on the front portion of the combine harvester. Also, the conveying device 16 is provided to the back of the harvesting unit H. Also, the harvesting unit H includes a cutting mechanism 15 and a reel 17.

The grain stalk reaped by the cutting mechanism 15 is conveyed to the threshing device 13 via the conveying device 16. The reaped grain stalk is threshed at the threshing device 13. The grain obtained by threshing is stored in the grain tank 14. The grain stored in the grain tank 14 is discharged out of the vehicle by the grain discharge device 18 as necessary. The harvesting unit H, the propulsion device 11, the conveying device 16, and the threshing device 13 are driven by an engine 8, which is an example of a power source.

The vehicle body 10 of the combine harvester is provided with a plurality of cameras 4 (corresponding to image capture devices) that capture images of the surroundings of the vehicle body. The plurality of cameras 4 each capture an image (surrounding area image) of a predetermined region of the surroundings of the vehicle body 10, and these images are combined to generate an image (surroundings image) of the surroundings in all directions of the vehicle body 10. For example, as the cameras 4, a front camera 41 (an example of an image capture device), a back camera 42 (an example of an image capture device), a right camera 43 (an example of an image capture device), and a left camera 44 (an example of an image capture device) are provided. The front camera 41, the back camera 42, the right camera 43, and the left camera 44 each capture an image of the surrounding area of the vehicle body 10, generate a surrounding area image, and output the surrounding area image to an image processing unit 70 described below (see FIG. 4). Note that the surrounding area images in the present embodiment may be still images or may be moving images. Also, the cameras 4 are not limited to numbering four, and it is only required that the number of cameras 4 is sufficient to capture the entire surroundings of the vehicle body 10.

Figure 2:
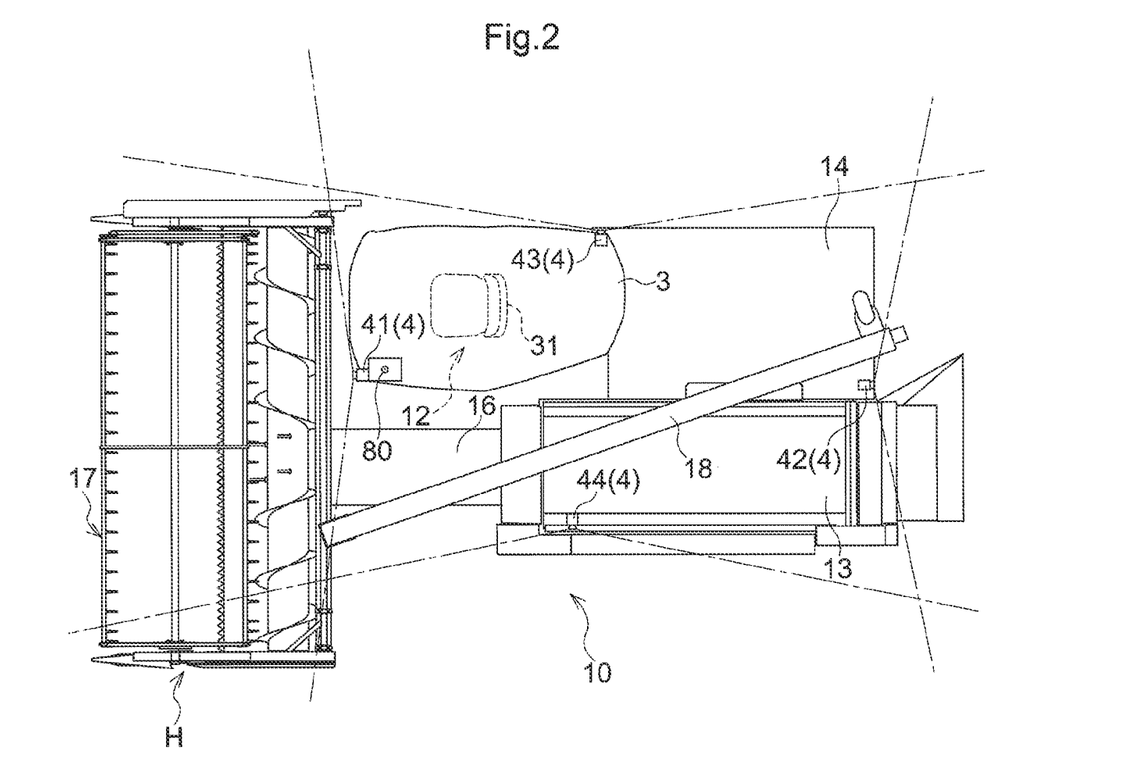
FIG. 2 is a plan view of a vehicle body of a standard combine harvester.
Figure 3:
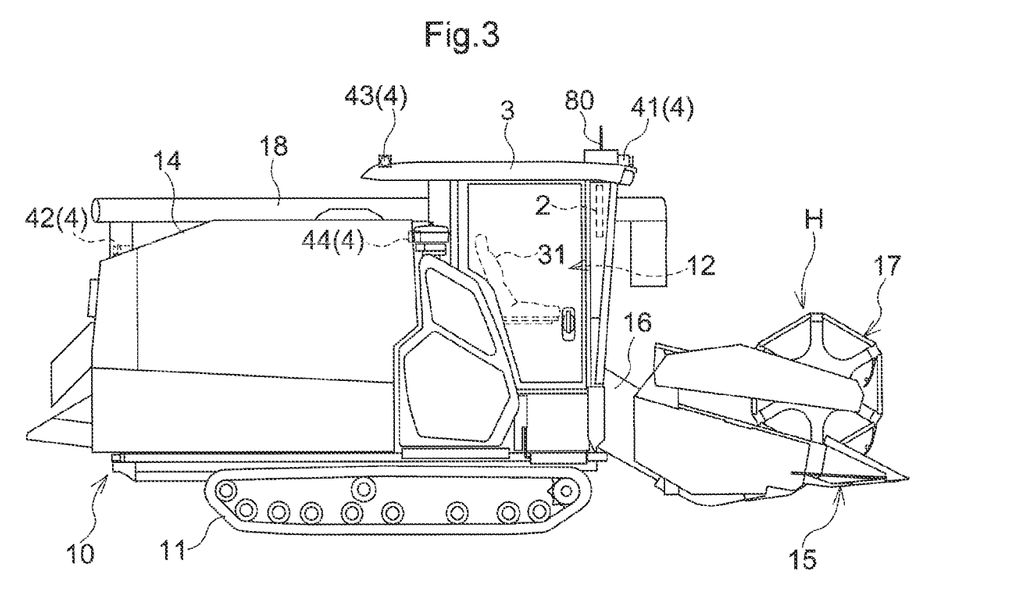
FIG. 3 is a left side view of a vehicle body of a standard combine harvester.

As illustrated FIGS. 1 to 3, the front camera 41 is provided at the front portion of the driving section 12. Specifically, the front camera 41 is provided at the front upper portion of the cabin 3. The front camera 41 is located at or near the left end portion of the cabin 3 in the vehicle body left-and-right direction and located at a central portion of the vehicle body 10 in the vehicle body left-and-right direction. The front camera 41 is orientated to face diagonally forward and downward and captures images to the front of the vehicle body 10.

The back camera 42 is provided at the upper portion of the back end portion of the grain tank 14. The back camera 42 is located at or near the left end portion of the grain tank 14 in the vehicle body left-and-right direction and located at a central portion of the vehicle body 10 in the vehicle body left-and-right direction. The back camera 42 is orientated to face diagonally backward and downward and captures images to the back of the vehicle body 10.

The right camera 43 is provided at an upper corner portion of the right side portion of the cabin 3. The right camera 43 is located at the back end portion of the cabin 3 and located at or near the central portion of the vehicle body 10 in the vehicle body front-and-back direction. The right camera 43 is orientated to face diagonally downward and right and captures images to the right of the vehicle body 10.

The left camera 44 is provided at an upper corner portion of the left side portion of the threshing device 13. The left camera 44 is located at or near the front end portion of the threshing device 13 in the vehicle body front-and-back direction and located at or near the central portion in the vehicle body front-and-back direction. The position of the left camera 44 in the vehicle body front-and-back direction is roughly the same as the position of the right camera 43 in the vehicle body front-and-back direction. The left camera 44 is orientated to face diagonally downward and left and captures images to the left of the vehicle body 10.

The display device 2 is provided in the driving section 12. A composite image based on the surrounding area images captured by the front camera 41, the back camera 42, the right camera 43, and the left camera 44 is generated, and the composite image is displayed on the display device 2. The display device 2 is disposed diagonally left and forward of the driver seat 31.

Configuration of Control System

Next, the configuration of a control system of a combine harvester will be described using FIGS. 1 to 4. The control system of the embodiment includes a control unit 6 and is constituted of multiple electronic control units (processors), i.e., ECUs, various operation devices, sensor groups, switch groups, and a wiring network such as an in-vehicle LAN for data transmission between these devices. Note that the control unit 6 may be constituted by such hardware, or one or all of the configurations may be constituted by software that execute the appropriate process. Also, such configurations may be implemented via a program executed by a processor. In this case, the program is stored in a discretionary storage device installed in the combine harvester.

Figure 4:
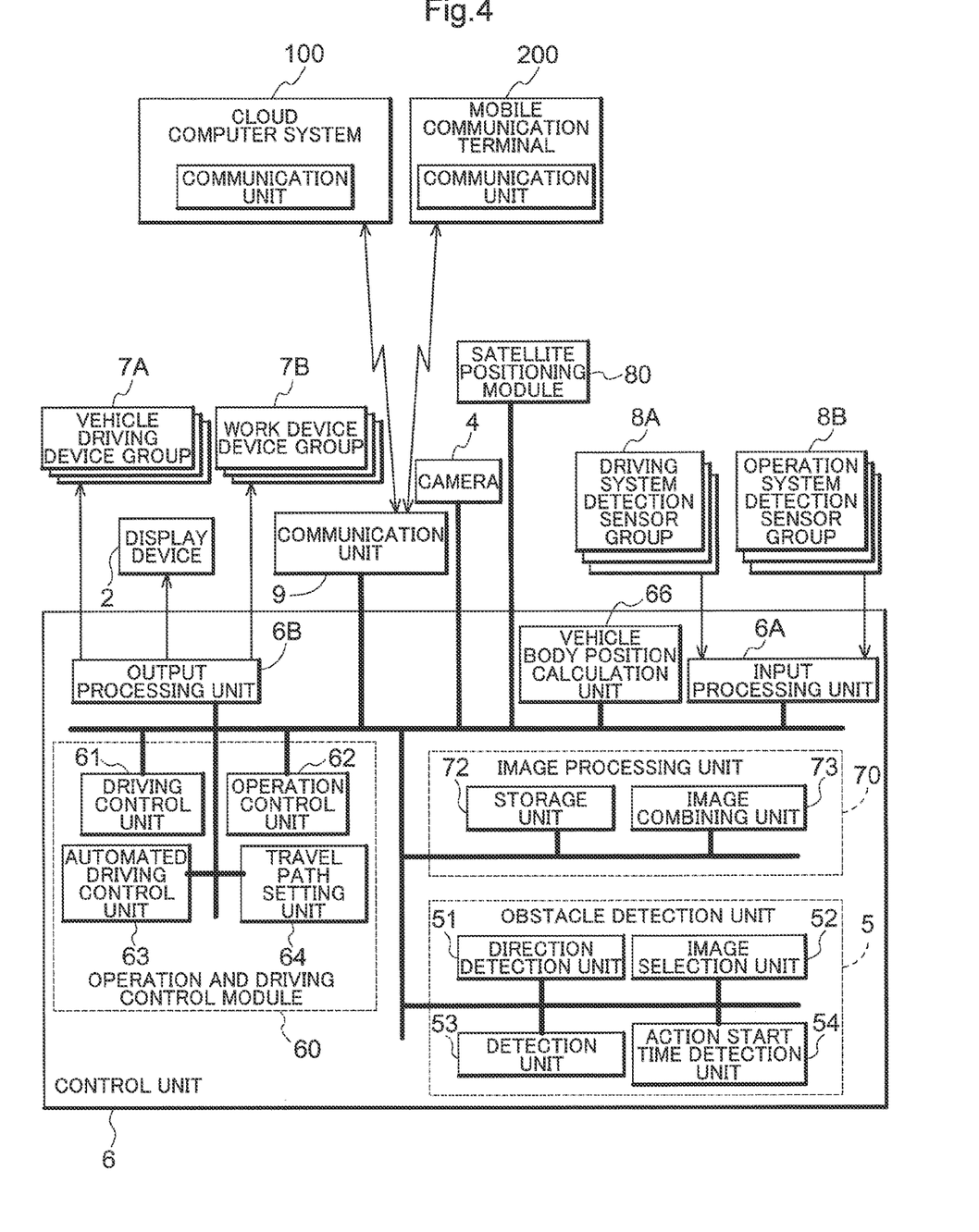
FIG. 4 is a functional block diagram illustrating a control system of a combine harvester.

The control unit 6 is a key element of the control system and is represented as an assembly of ECUs. The control unit 6 is connected to the various operation devices, sensor groups, switch groups, and the like via the wiring network. Furthermore, the control unit 6 is connected to various devices provided outside of the combine harvester via a communication unit 9 in a data communication enabled state.

The communication unit 9 is used by the control system of the combine harvester for exchanging data with a cloud computer system 100 remotely installed, a mobile communication terminal 200, and the like. The mobile communication terminal 200 in this example is a tablet computer operated by an observer (including a driver and worker) at the site of operation and driving.

The positioning data from the satellite positioning module 80 and the image data from the cameras 4 described above are input to the control unit 6 via the wiring network.

The control unit 6 is provided with an input processing unit 6A and an output processing unit 6B as an I/O interface. A driving system detection sensor group 8A, an operation system detection sensor group 8B, and the like are connected to the input processing unit 6A. The driving system detection sensor group 8A may include an engine speed adjustment unit, an accelerator pedal, a brake pedal, a transmission operation unit, and other sensors and the like that detect states. The operation system detection sensor group 8B may include sensors and the like that detect the device state of the harvesting unit H, the threshing device 13, the grain discharge device 18, and the conveying device 16 and the state of the grain stalk and the grain.

A vehicle driving device group 7A and a work device device group 7B are connected to the output processing unit 6B. The vehicle driving device group 7A may include control devices relating to vehicle driving, such as an engine control device, a transmission control device, a braking control device, a steering control device, and the like. The work device device group 7B may include, for example, a power control device for the harvesting unit H, the threshing device 13, the grain discharge device 18, the conveying device 16.

The control unit 6 is provided with an operation and driving control module 60, the image processing unit 70, an obstacle detection unit 5, and a vehicle body position calculation unit 66.

The vehicle body position calculation unit 66 calculates the vehicle body position, which corresponds to map coordinates of the vehicle body 10, on the basis of positioning data successively sent from the satellite positioning module 80.

The combine harvester of the embodiment is capable of being driven via both automated driving (automated steering) and manual driving (manual steering). The operation and driving control module 60 is provided with an automated driving control unit 63 and a travel path setting unit 64, in addition to a driving control unit 61 and an operation control unit 62. The driving section 12 is provided with a driving mode switch (not illustrated) for selecting either an automated driving mode in which the vehicle is driven with automated steering or a manual steering mode in which the vehicle is driven with manual steering. By operating the driving mode switch, the driving can transition from manual steering driving to automated steering driving or from automated steering driving to manual steering driving.

The driving control unit 61 includes an engine control function, a steering control function, a vehicle speed control function, and the like and sends a driving control signal to the vehicle driving device group 7A. The operation control unit 62 sends an operation control signal to the work device device group 7B in order to control the movement of the harvesting unit H, the threshing device 13, the grain discharge device 18, the conveying device 16, and the like.

In a case where the manual steering mode is selected, the driving control unit 61 generates a control signal on the basis of operation by the driver and controls the vehicle driving device group 7A. Also, on the basis of operation by the driver, the operation control unit 62 generates a control signal and controls the work device device group 7B. In a case where the automated steering mode is selected, the driving control unit 61 controls the vehicle driving device group 7A relating to steering and the vehicle driving device group 7A relating to vehicle speed on the basis of an automated driving command sent by the automated driving control unit 63. Also, on the basis of an automated driving command sent by the automated driving control unit 63, the operation control unit 62 controls the work device device group 7B.

The travel path setting unit 64 loads a travel path for the automated driving generated at the control unit 6, the mobile communication terminal 200, the cloud computer system 100, or the like on a memory (not illustrated) built in the travel path setting unit 64. The travel path loaded on the memory (not illustrated) is sequentially used as a target travel path for the automated driving. The travel path can be used in the guidance of the combine harvester to guide it to drive along the travel path even in the case of manual driving. In a case where the automated steering mode is selected, the target travel path and the drive state of the work device device group 7B executed in turn corresponding to the target travel path are set in advance as the action relating to automated driving.

The automated driving control unit 63, more specifically, generates an automated steering command and a vehicle speed command and sends these commands to the driving control unit 61. The automated steering command is generated to eliminate any orientation discrepancy and any position discrepancy between the travel path from the travel path setting unit 64 and the vehicle position calculated by the vehicle body position calculation unit 66. The vehicle speed command is generated on the basis of a pre-set vehicle speed value. Furthermore, the automated driving control unit 63 sends a work device action command to the operation control unit 62 in accordance with the vehicle position and the drive state of the vehicle.

The image processing unit 70 acquires the surrounding area images captured by the front camera 41, the back camera 42, the right camera 43, and the left camera 44. Specifically, the image processing unit 70 is input with a front surrounding area image of the front area of the vehicle body 10 from the front camera 41, input with a back surrounding area image of the back area of the vehicle body 10 from the back camera 42, input with a right surrounding area image of the right area of the vehicle body 10 from the right camera 43, and input with a left surrounding area image of the left area of the vehicle body 10 from the left camera 44. The image processing unit 70 generates a surroundings image representing the entire surroundings of the vehicle body 10 on the basis of the surrounding area images and outputs the surroundings image to the display device 2. The display device 2 displays the surroundings image output by the image processing unit 70.

The image processing unit 70 is provided with a storage unit 72 and an image combining unit 73.

The storage unit 72 stores the vehicle body data indicating the external shape of the vehicle body 10. The vehicle body data may be data indicating the shape of the vehicle body 10 in a plan view, may be data indicating the three-dimensional shape of the vehicle body 10, or may be data indicating a 3D model of the vehicle body 10, for example. The vehicle body data includes data indicating the external shape of the harvesting unit H, data indicating the external shape of the grain discharge device 18, and data indicating the external shape of the grain tank 14.

The image combining unit 73 generates a surroundings image, which is an image representing the vehicle body 10 and the surroundings of the vehicle body 10, on the basis of the four surrounding area images input from the front camera 41, the back camera 42, the right camera 43, and the left camera 44 and the vehicle body data stored in the storage unit 72 and outputs the surroundings image to the display device 2. The harvesting unit H, the grain discharge device 18, and the grain tank 14 are displayed in the surroundings image.

Figure 5:
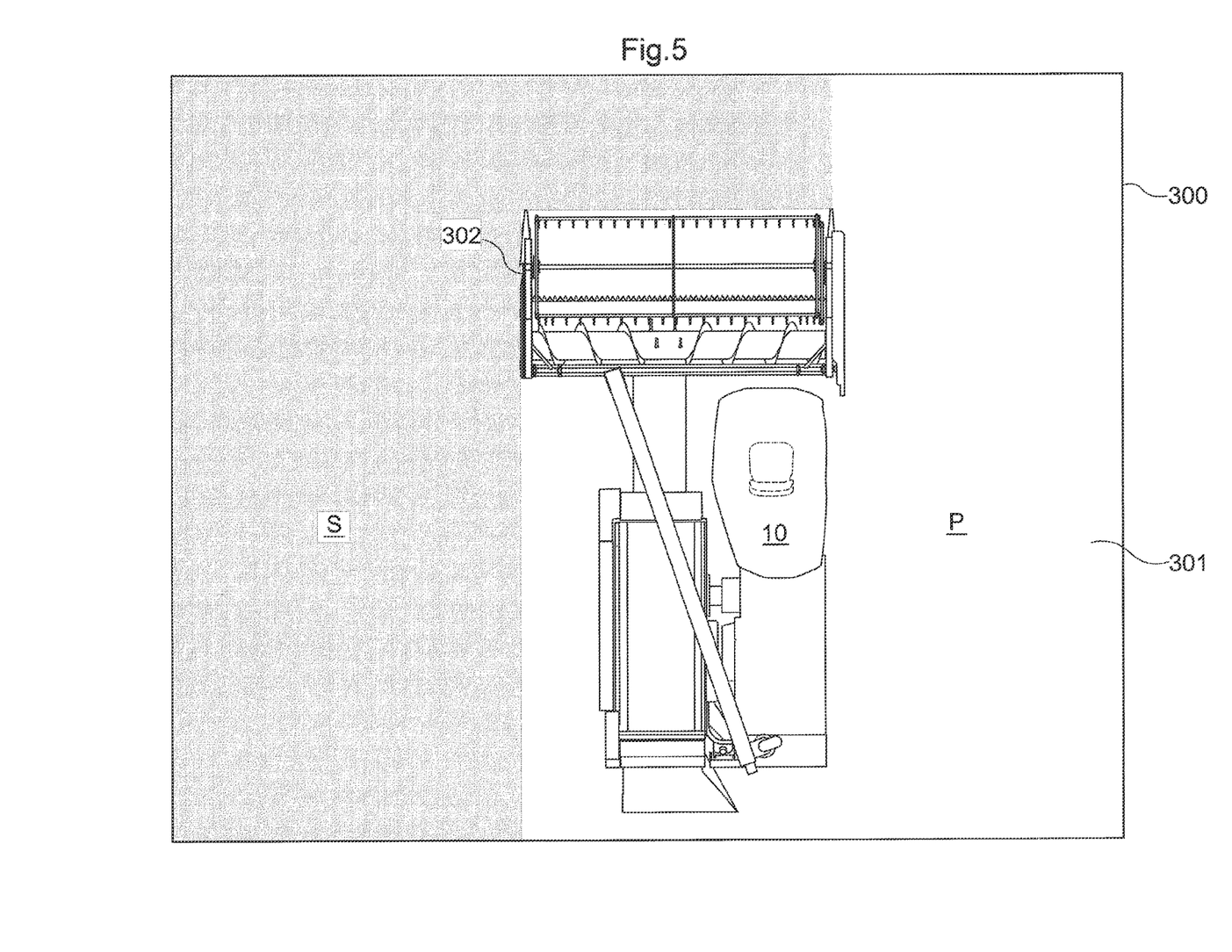
FIG. 5 is a diagram illustrating an example of a surroundings image.

Next, an example of the surroundings image will be described using FIG. 5 as well as referencing FIGS. 1 and 4. FIG. 5 is a diagram illustrating an example of a surroundings image 300 of a case where the combine harvester is advancing through a field and performing harvesting.

The surroundings image 300 is generated by the image combining unit 73. First, the image combining unit 73 generates a surroundings composite image 301 from the four surrounding area images input from the front camera 41, the back camera 42, the right camera 43, and the left camera 44. The surroundings image 300 is generated by the image combining unit 73 combining a vehicle body image 302 stored in advance in the storage unit 72 and the surroundings composite image 301. In the surroundings composite image 301 around the vehicle body image 302, a reaped area P to the right and the back of the vehicle body 10 and an unreaped area S to the left and the front of the vehicle body 10 are displayed.

As illustrated in FIG. 4, the obstacle detection unit 5 is provided with a direction detection unit 51, an image selection unit 52, and a detection unit 53.

The direction detection unit 51 determines the state of the operation and driving acquired from the operation and driving control module 60, a change in the vehicle body position calculated by the vehicle body position calculation unit 66, or determines all of these comprehensively and obtains the advancement direction of the vehicle body 10.

The image selection unit 52 determines which one from among the front camera 41, the back camera 42, the right camera 43, the left camera 44 (see FIG. 1 for all) is the camera 4 capturing an image of the advancement direction of the vehicle body 10 (see FIG. 1 for this and all following instances) obtained by the direction detection unit 51. The image selection unit 52 acquires the surrounding area image captured by the camera 4 determined to be the camera 4 capturing the advancement direction of the vehicle body 10. For example, in a case where the front is determined to be the advancement direction of the vehicle body 10, the image selection unit 52 selectively acquires a front surrounding area image captured by the front camera 41 (see FIG. 1) as a detection image 303 (see FIG. 6 for this and all following instances). The acquired detection image 303 is passed to the detection unit 53.

Figure 6:
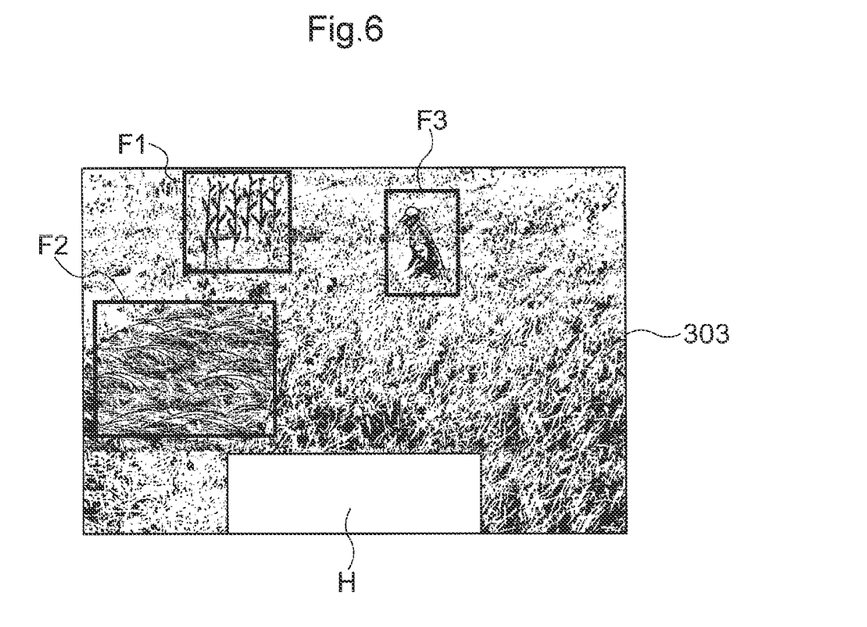
FIG. 6 is a diagram for describing an example of detecting an obstacle in a detection image.

The detection unit 53 analyzes the detection image 303 received from the image selection unit 52 and detects obstacles. Obstacles can be detected using various image analysis devices or image analysis methods. For example, obstacles can be detected via image analysis using artificial intelligence. Specifically, the detection unit 53 may use trained data of a neural network or the like trained via machine learning (deep learning) to detect obstacles. In a case where the detection result corresponds to the presence or absence of obstacles or whether an obstacle can be detected, the detection unit 53 transmits the position and type of the obstacle/s to the operation and driving control module 60.

Next, a specific example of obstacle detection will be described using an example of the detection image 303 in a case where the vehicle body 10 is advancing using FIG. 6 and referencing FIG. 4.

Because in this case the vehicle body 10 is advancing, the detection image 303 includes an image of the field in front of the harvesting unit H and the vehicle body 10. In a case where there are foreign objects other than crops in the field, the detection unit 53 detects foreign objects as obstacles. In the detection image 303, a person F3 is detected as an obstacle.

In this manner, in the present embodiment, when an obstacle is detected, from among the surrounding area images captured by the plurality of cameras 4, the surrounding area image corresponding to the advancement direction of the vehicle body 10 is selectively acquired as the detection image 303 for analysis. Typically, when the data amount of the image for analysis is large, the analysis capability, including analysis accuracy, analysis speed, and the like, is reduced due to performance constraints of the analysis device or the like. In regards to this, in the present embodiment, the surrounding area image corresponding to the advancement direction of the vehicle body 10 is the target for analysis, i.e., the detection image 303, and thus the load on the analysis device or the like is reduced. As a result, the analysis capability, including analysis accuracy, analysis speed, and the like, can be enhanced, and obstacles can be detected with a higher accuracy in a shorter time. Also, the area of the detection image 303 is narrowed so that the resolution of the detection image 303 can be easily increased. This also allows the detection accuracy of obstacles to be enhanced. Furthermore, by detecting obstacles using only the surrounding area image in the advancement direction of the operation and driving, the detection of obstacles that do not impede the operation and driving can be minimized or prevented, and obstacles with a high likelihood of impeding the operation and driving can be appropriately detected.

Furthermore, when an obstacle is detected, the automated driving control unit 63 of the operation and driving control module 60 receives an obstacle detection result and changes the action which has been set in accordance with the detection result. When the combine harvester is being automatically driven, the automated driving control unit 63 executes control of the operation and driving so that the combine harvester drives along the travel path set by the travel path setting unit 64 and the actions for controlling the work device device group 7B are transitioned through in a pre-set order. Also, when an obstacle is detected, the automated driving control unit 63 changes the pre-set actions. For example, when a detection result indicating that an obstacle has been detected is received, the automated driving control unit 63 stops the vehicle, changes the travel path, stops the work device device group 7B, and changes the state of the work device device group 7B.

As described above, when an obstacle is detected in the advancement direction, the actions relating to automated driving are changed. This helps prevent appropriate operation and driving being impeded by an obstacle. For example, by stopping operation and driving, the obstacle can be removed before operation and driving is once again started. This allows appropriate operation and driving to continue even when there is an obstacle.

Other Embodiments

1. As described above, with operation and driving controlled by automated driving, one action transitions to the next action in a pre-set order of actions. Here, in the embodiment described above, a surrounding area image corresponding to an image captured in the front advancement direction during an action (a surrounding area image captured by the camera 4 capturing the front advancement direction) is selected as the detection image. When an action is transitioned to, from before the transition, the surrounding area image corresponding to the image capturing the front advancement direction of the next action may be selected as the detection image. For example, in a case where the action transition is from driving straight into a left turn, in the final stage of driving straight, the surrounding area image selected as the detection image is switched from the front surrounding area image captured by the front camera 41 to the left surrounding area image captured by the left camera 44. The timing of the switch may be a predetermined amount of time before the next action is started, or may be when the combine harvester reaches a predetermined distance behind the position where the next action is started. Here, as illustrated in FIG. 4, the obstacle detection unit 5 is provided with an action start time detection unit 54 in addition to the direction detection unit 51, the image selection unit 52, and the detection unit 53. The action start time detection unit 54 detects a predetermined amount of time before when the action transitions or when the combine harvester has reached a predetermined distance behind the position where the action transitions and transmits this to the image selection unit 52. Then, the image selection unit 52 selects and obtains the surrounding area image of the front advancement direction of the next action as the detection image. Note that the advancement direction is not limited to being the front of the vehicle body 10 in a case where the vehicle is driven forward, and, in a case where the vehicle is driven backward, the back of the vehicle body 10 corresponds to the advancement direction. Also, in a case of a left turn, the left direction of the vehicle body 10 corresponds to the advancement direction.

In this manner, before an action is transitioned to, the surrounding area image captured by the camera 4 capturing the front advancement direction of the next action is selected as the detection image, and obstacles are detected using the detection image. Thus, even when after action transition, obstacles present in the front advancement direction after transition can be detected from before the transition. This allows obstacles that will impede operation and driving to be appropriately detected when transitioning between actions. Furthermore, in a case where an obstacle is detected in the front advancement direction of the next action before action transition, operation and driving can be stopped and action transition can be stopped. Accordingly, action transition can be held off until the obstacle in the advancement direction of the next action is no longer present, and the appropriate operation and driving can be continued.

2. In the embodiments described above, in addition to the surrounding area image corresponding to the captured image of the front advancement direction, the surrounding area image corresponding to the image adjacent to the captured image of the front advancement direction can be used as the detection image. For example, when the combine harvester is driving straight, the front surrounding area image captured by the front camera 41 and the left surrounding area image captured by the left camera 44 may be selected as detection images for obstacle detection.

With such a configuration, because all of the surrounding area images are not used as detection images, obstacles can be detected with high accuracy and the obstacle detection range can be efficiently increased. This allows for obstacles to be more appropriately detected.

3. In the embodiments described above, the detection unit 53 transmits the obstacle detection result to the operation and driving control module 60, and the operation and driving control module 60 changes the action in accordance with the presence/absence, position, and type of obstacles. However, for the embodiments described above, as long as obstacles can be detected, the following processing is discretionary. For example, according to the obstacle detection result, the control unit 6 may display the detection image 303 showing the obstacle/s and/or information indicating the presence of an obstacle on the display device 2, may display this detection image 303 and/or information of the mobile communication terminal 200, or may send a warning to a non-illustrated notification unit.

In this manner, the worker can be made aware of the presence of an obstacle and manually take the appropriate measures as necessary. This allows operation and driving to be appropriately continued.

4. In the embodiments described above, the front camera 41, the back camera 42, the right camera 43, and the left camera 44 may constantly capture surrounding area images, and the image selection unit 52 may selectively acquire one or two or more of the surrounding area images as the detection image. However, a configuration may be used in which the front camera 41, the back camera 42, the right camera 43, and the left camera 44 are not required to constantly capture surrounding area images, and at least only the camera 4 capturing the surrounding area image selected by the image selection unit 52 capture images. Furthermore, the detection image may be selected per surrounding area image, or an image of a necessary region may be extracted from a surrounding area image or a surroundings image.

5. The placement positions of the front camera 41, the back camera 42, the right camera 43, and the left camera 44 are not limited to the placement positions in the embodiments described above. The front camera 41, the back camera 42, the right camera 43, and the left camera 44 may be placed anywhere as long as they can capture an image of a least a portion of the surroundings of the vehicle body 10. For example, the back camera 42 may be provided at the back end portion of the upper portion of the threshing device 13, and the right camera 43 may be provided at the front side portion of the right end portion of the upper portion of the grain tank 14. Also, the cameras 4 are not limited to being directly provided on the vehicle body 10 and may be provided on a stay or the like to enable capturing of a more appropriate surrounding area image. Furthermore, the cameras 4 are not limited to four, and cameras numbering a discretionary number of one or more may be provided. Also, the surroundings image is not required to include the entire area around the vehicle body 10 and a portion of the surrounding region may be missing.

6. The foreign object may be an abnormality in the crops as well as the person F3, and an abnormality in the crops can be detected as a type of obstacle. In the detection image 303 illustrated in FIG. 6, weeds F1 and flattened crops F2 are detected as obstacles.

INDUSTRIAL APPLICABILITY

The present invention can be applied to a standard combine harvester, a head-feeding combine harvester, as well as an agricultural vehicle and other working vehicles.

DESCRIPTION OF REFERENCE SIGNS

2: Display device
4: Camera (image capture device)
10: Vehicle body
51: Direction detection unit
52: Image selection unit
53: Detection unit
63: Automated driving control unit
70: Image processing unit
300: Surroundings image
303: Detection image
F1: Weeds (obstacle)
F2: Flattened crops (obstacle)
F3: Person (obstacle)

The invention claimed is:

1. A working vehicle capable of operation and driving, comprising:
a plurality of image capture devices that capture an image of surroundings of a vehicle body;
a direction detection unit that detects an advancement direction of the operation and driving;
an image selection unit that acquires, as a detection image, a surrounding area image captured by one image capture device of the plurality of image capture devices capturing a front advancement direction detected by the direction detection unit;
a detection unit that analyzes the detection image acquired by the image selection unit and detects an obstacle; and
an automated driving control unit that executes automated driving control of the operation and driving by executing pre-set actions in order,
wherein, when the vehicle body is a predetermined distance before a position where a next action of the pre-set actions is started, and before a transition from a current action of the pre-set actions to the next action, the image selection unit selectively acquires, as the detection image, an image from a first image capture device of the plurality of image capture devices in a front advancement direction of the next action, the front advancement direction of the next action being different than the front advancement direction of the current action, and the first image capture device being different than an image capture device of the plurality of image capture devices configured to capture images in the front advancement direction of the current action, and
wherein, in response to the detection unit detecting the obstacle in the image in the front advancement direction of the next action, the automated driving control unit stops a transition to the next action until the obstacle is no longer detected.

2. The working vehicle according to claim 1, wherein:
in a case where an obstacle is detected by the detection unit, the automated driving control unit changes a pre-set next one of the actions.

3. The working vehicle according to claim 1, wherein:
the image selection unit selectively acquires, as the detection image, the surrounding area image captured by one image capture device of the plurality of image capture devices capturing a front advancement direction of a next one of the actions a predetermined amount of time before the next one of the actions is started.

4. The working vehicle according to claim 1, wherein:
in a case where an obstacle is detected by the detection unit, the automated driving control unit stops the operation and driving.

5. The working vehicle according to claim 1, wherein:
the image selection unit selectively acquires, as the detection image, the surrounding area image capturing a front advancement direction and the surrounding area image captured by one image capture device of the plurality of image capture devices capturing a region to a side of the vehicle body adjacent to a captured region of the surrounding area image capturing a front advancement direction.

6. The working vehicle according to claim 1, wherein:
the detection unit detects an obstacle using a neural network trained by machine learning.

7. The working vehicle according to claim 1, further comprising:
an image processing unit that combines the surrounding area images captured by the plurality of image capture devices and generates a surroundings image of an entire surroundings of the vehicle body; and
a display device where the surroundings image is displayed.

8. An obstacle detection method for when a working vehicle performs operation and driving, comprising:
capturing images of a surroundings of a vehicle body as a plurality of surrounding area images using a plurality of image capture devices;
detecting an advancement direction of the operation and driving;
acquiring, from the plurality of surrounding area images, the surrounding area image capturing a front advancement direction as a detection image;
analyzing the detection image and detecting an obstacle;
executing automated driving control of the operation and driving by executing pre-set actions in order;
selectively acquiring, when the vehicle body is a predetermined distance before a position where a next action of the pre-set actions is started, and before a transition from a current action of the pre-set actions to the next action, an image, as the detection image, from a first image capture device of the plurality of image capture devices in a front advancement direction of the next action, wherein the front advancement direction of the next action is different than the front advancement direction of the current action, and the first image capture device being different than an image capture device of the plurality of image capture devices configured to capture images in the front advancement direction of the current action; and
in response to detecting the obstacle in the image in the front advancement direction of the next action, stopping a transition to the next action until the obstacle is no longer detected.

9. The obstacle detection method according to claim 8, wherein:
in a case where an obstacle is detected, a pre-set next one of the actions is changed.

10. The obstacle detection method according to claim 8, wherein:
as the detection image, the surrounding area image capturing a front advancement direction of a next one of the actions is selectively acquired a predetermined amount of time before the next one of the actions is started.

11. The obstacle detection method according to claim 8, wherein:
when an obstacle is detected, the operation and driving is stopped.

12. The obstacle detection method according to claim 8, wherein:
as the detection image, the surrounding area image capturing a front advancement direction and the surrounding area image capturing a region to a side of the vehicle body adjacent to a captured region of the surrounding area image capturing a front advancement direction are selectively acquired.

13. The obstacle detection method according to claim 8, wherein:
an obstacle is detected using a neural network trained by machine learning.

14. The obstacle detection method according to claim 8, further comprising:
combining the plurality of surrounding area images and generating a surroundings image of an entire surroundings of the vehicle body; and
displaying the surroundings image.

15. A computer program product comprising at least one non-transitory computer-readable storage medium including an obstacle detection program for when a working vehicle performs operation and driving that, when executed by a computer comprising at least one processor, causes the at least one processor to perform:
processing to acquire a plurality of surrounding area images capturing a surroundings of a vehicle body using a plurality of image capture devices;
processing to detect an advancement direction of the operation and driving;
processing to select, from the plurality of surrounding area images, the surrounding area image capturing a front advancement direction as a detection image;
processing to analyze the detection image and detect an obstacle;
processing to execute automated driving control of the operation and driving by executing pre-set actions in order;
processing to selectively acquire, when the vehicle body is a predetermined distance before a position where a next action of the pre-set actions is started, and before a transition from a current action of the pre-set actions to the next action, an image, as the detection image, from a first image capture device of the plurality of image capture devices in a front advancement direction of the next action, wherein the front advancement direction of the next action is different than the front advancement direction of the current action, and the first image capture device being different than an image capture device of the plurality of image capture devices configured to capture images in the front advancement direction of the current action; and
in response to detecting the obstacle in the image in the front advancement direction of the next action, processing to stop a transition to the next action until the obstacle is no longer detected.

16. The computer program product according to claim 15, wherein:
in a case where an obstacle is detected, a pre-set next one of the actions is changed.

17. The computer program product according to claim 15, wherein:
as the detection image, the surrounding area image capturing a front advancement direction of a next one of the actions is selectively acquired a predetermined amount of time before the next one of the actions is started.

18. The computer program product according to claim 15, wherein:
when an obstacle is detected, the operation and driving is stopped.

19. The computer program product according to claim 15, wherein:
as the detection image, the surrounding area image capturing a front advancement direction and the surrounding area image capturing a region to a side of the vehicle body adjacent to a captured region of the surrounding area image capturing a front advancement direction are selectively acquired.

20. The computer program product according to claim 19, wherein:
an obstacle is detected using a neural network trained by machine learning.

21. The computer program product according to claim 19, further causing the at least one processor to perform:
processing to combine the plurality of surrounding area images and generate a surroundings image of an entire surrounds of the vehicle body; and
processing to display the surroundings image.

* * * * *